MAKE-BUSY CIRCUIT FOR TRUNKS IN UNATTENDED DIAL OFFICE

Filed April 29, 1955 2 Sheets-Sheet 1

INVENTOR
A. T. KUPFERLE
BY R. O. Covell
ATTORNEY

Dec. 23, 1958 A. T. KUPFERLE 2,866,005

MAKE-BUSY CIRCUIT FOR TRUNKS IN UNATTENDED DIAL OFFICE

Filed April 29, 1955 2 Sheets-Sheet 2

INVENTOR
A. T. KUPFERLE
BY R. O. Covell
ATTORNEY

United States Patent Office 2,866,005

Patented Dec. 23, 1958

2,866,005

MAKE-BUSY CIRCUIT FOR TRUNKS IN UNATTENDED DIAL OFFICE

Arthur T. Kupferle, East Orange, N. J., assignor to American Telephone and Telegraph Company, a corporation of New York Application April 29, 1955, Serial No. 504,709

8 Claims. (Cl. 179—18)

This invention relates to telephone systems and particularly to systems comprising an unattended dial office and a master office with trunks therebetween.

Objects of the invention are an improvement in the service rendered by an unattended dial telephone office, a reduction in interference with telephone traffic in such offices due to troubles, and improvements in the supervision of such offices and in the means for maintaining telephone service.

This invention pertains to a telephone system including an unattended dial office and a master office with trunks therebetween and including circuit means controlled by an operator in the master office for removing trunks from and restoring trunks to service at the dial office, whereby interference with service is reduced and maintenance visits to the unattended office may be minimized.

A feature of the invention is a make-busy circuit arrangement for each trunk of a group of trunks in a dial office, each make-busy circuit being selectable and operable under the control of an operator in a master office to remove the associated trunk from service by marking the trunk busy and to restore the trunk to service by removing the busy marking. A further feature of the invention involves the provision of a make-busy circuit arrangement for each trunk of a group for enabling an operator in a master office to determine whether or not the trunk is in use, whether or not the trunk is idle, and whether or not the trunk is marked busy because a call is in progress thereover or because it has been removed from service.

A system emdodying the invention and its features, including those above mentioned, is disclosed in the drawing which consists of two figures. The invention is not limited in its application to the system herein described but is generally applicable to any system including a dial office. Referring to the drawing.

Figure 1:
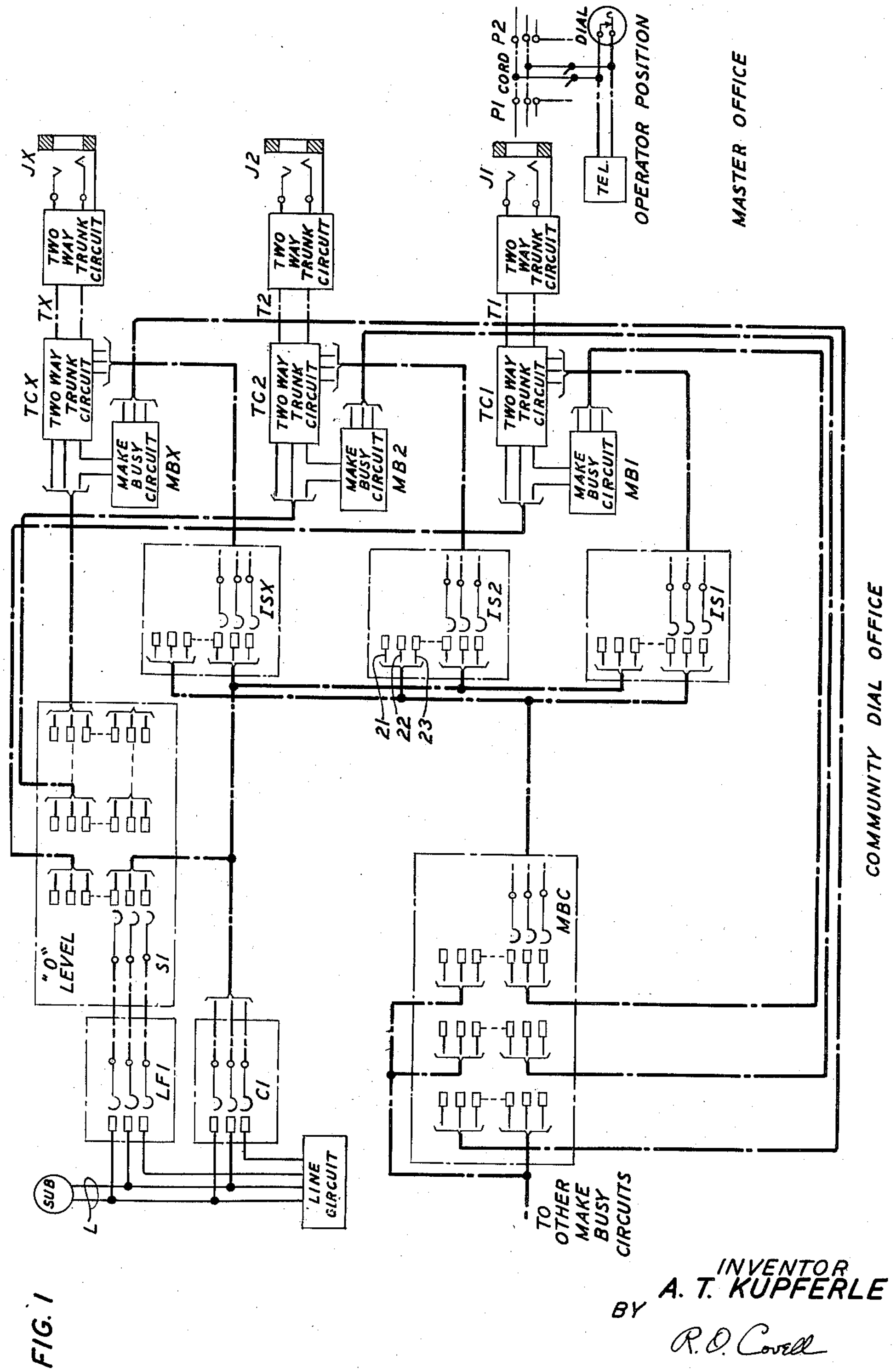
Fig. 1 shows in schematic form a system comprising a dial office and a master office with trunks therebetween.

The master office represented in Fig. 1 comprises a manual switchboard including operator position equipment represented by a telephone, a dial, a plug-ended cord and by jacks J1, J2 and JX, each jack individually associated with a two-way trunk circuit and the associated one of a group of interoffice trunks T1, T2 and TX, respectively. These trunks, which represent the first, second and last trunk in a group between the master office and a community dial office are individually connected to two-way trunk circuits TC1, TC2 and TCX, respectively, in the community dial office. The dial office further comprises subscribers' telephone stations and lines represented by a station entitled "sub" and line L, line finders represented by switch LF1, local selectors represented by switch S1, and connectors represented by switch C1. The dial office further comprises incoming selectors represented by switches IS1, IS2 and ISX, each individually associated with one of the trunk circuits TC1, TC2 and TCX, a make-busy connector switch MBC and trunk make-busy circuits MB1, MB2 and MBX, individually associated with trunk circuits TC1, TC2 and TCX, respectively.

The line finder, local selector, incoming selector and connector switches are represented as being of the well-known two-motion, step-by-step type. For a description of the structure and operation of such switches reference may be had to Automatic Telephony by Smith and Campbell, 2nd edition, pages 53 to 65, published in 1921 and to Patent No. 1,799,654 granted April 7, 1931 to R. L. Stokely.

As shown in Fig. 1, each switch is represented by a set of wipers and one or more sets of terminals in the bank associated therewith. A local selector S1 is represented by the wipers and a first, second and last set of terminals in each of two levels, the upper level being the "0" level. The incoming selectors IS1, IS2 and ISX are each represented by the wipers and two sets of terminals, one set representing terminals giving access to connector switches such as C1 and the other set representing terminals giving access to the make-busy connector switch MBC. The make-busy connector MBC is represented by the wipers and the first, second and third set of terminals in each of two levels, as many levels of terminals being connected to trunk make-busy circuits as are required for the trunk group involved in any particular system. The stepping and release magnets and relays and other circuit details of the line finder, selector and connector switches are omitted.

Figure 2:
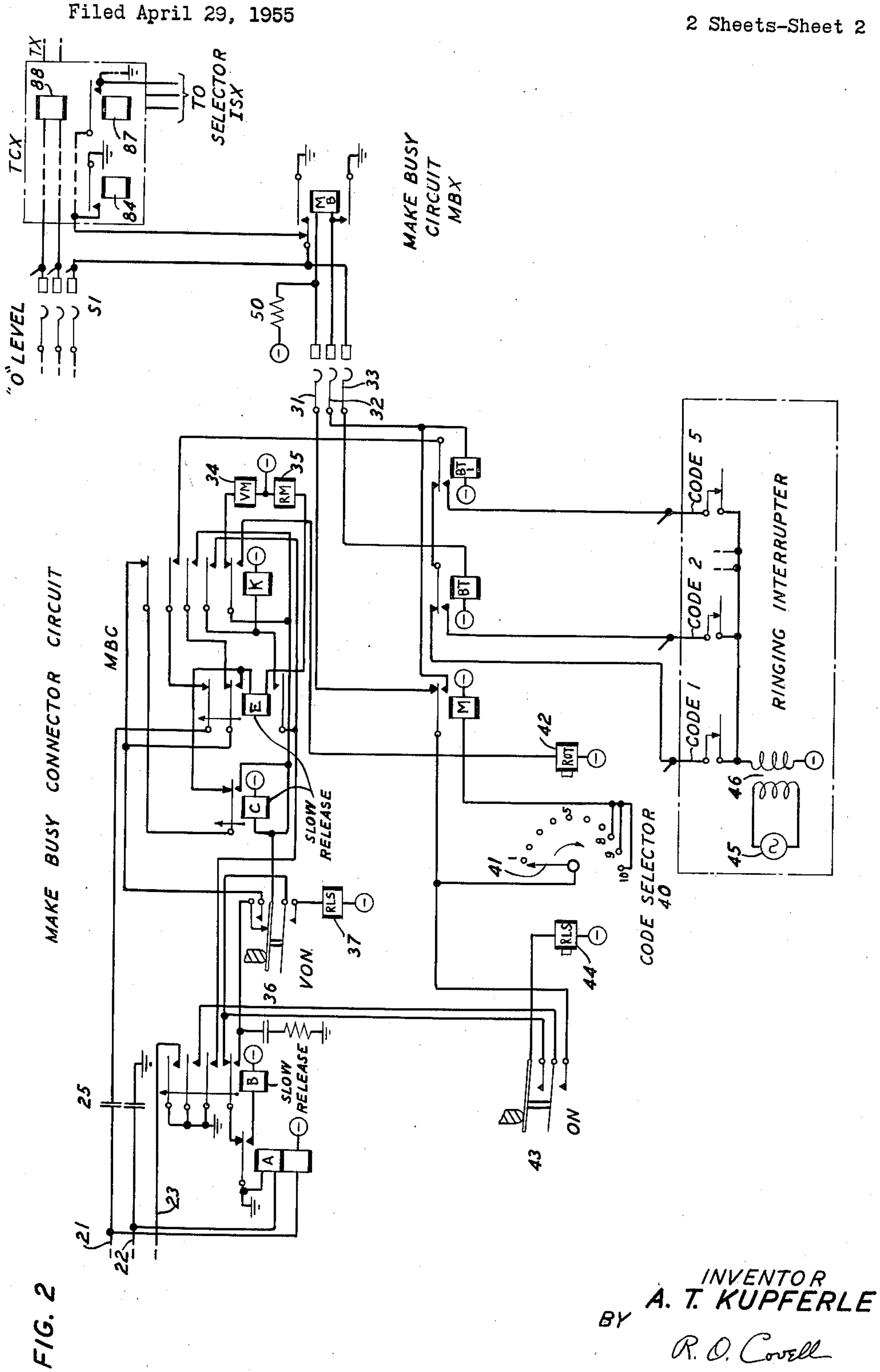
Fig. 2 shows in detailed schematic form a make-busy connector, a trunk make-busy circuit and a trunk circuit in the dial office.

The two-way trunk circuits TC1, TC2 and TCX in the dial office and the associated trunk circuits in the master office may be similar to corresponding trunk circuits disclosed in Patent No. 2,333,282, granted February 25, 1941, to R. B. Buchanan. The relays 84, 87 and 88 of the trunk circuit shown in part in Fig. 2, are the like identified relays of trunk circuit TC3 in Fig. 5 of the Buchanan patent. Relays 84 and 87 control the connection of busy-marking potential to the test conductor of the trunk circuit; and relay 88 is a supervisory relay bridged across the tip and ring conductors of the associated incoming selector on a call incoming from the master office.

Each of the make-busy circuits MB1, MB2 and MBX comprises a make-busy relay MB connected to one of the sets of terminals in the bank engageable by the wipers of the make-busy connector MBC. This relay controls the connection between the test conductor of the associated trunk circuit and the sleeve or test terminals to which this trunk circuit is connected in the banks of the local selector switches, such as S1; and controls the connection of a busy-marking potential to these terminals when it is desired to remove the trunk from service. In order that an operator in the master office may secure connection with the make-busy circuit of each and any of the trunks, digital code numbers are assigned to each trunk, this number corresponding to the location of the terminals in the banks of the incoming selector and make-busy connector switches through which connection may be made with each of the trunk make-busy circuits.

The make-busy connector MBC and one trunk make-busy circuit are shown in detail in Fig. 2, the input conductors 21, 22 and 23 thereshown being connected to a set of terminals in the banks of each of the incoming selectors, as shown in Fig. 1. This connector switch comprises wipers 31, 32 and 33 and an associated terminal bank consisting of ten levels, each level consisting of ten sets of terminals engageable by the wipers. This switch further comprises a vertical stepping magnet 34, a rotary stepping magnet 35, vertical off-normal contact springs 36, and a release magnet 37. The connector circuit MBC further comprises relays A, B, C, E, K, M, BT and BT1; and further comprises a single-motion, rotary, code selector 40 having a wiper 41 and a bank of ten terminals, a stepping magnet 42, off-normal contact springs 43 and a release magnet 44. The connector switch has access to each of the trunk make-busy circuits and the code selector enables control of the make-busy relay of any selected make-busy circuit. Fig. 2 also shows a ringing interrupter which provides ringing codes required in a dial office. The code 1, code 2 and code 5 supply conductors are connected to the make-busy connector MBC to provide signal tones as hereinafter described.

On a call initiated by a subscriber in the dial office to the master office, a line finder LF1 operates to connect the line L of the calling station to a first selector S1. When the calling subscriber dials the digit "0," the wipers of the associated selector S1 are stepped to the "0" level, and thereupon stepped in this level to select the trunk circuit of an idle trunk to the master office. In the selected two-way trunk circuit, a relay 84 (shown in Fig. 2) is operated to connect a busy-marking potential to the test conductor and terminal in the banks of all of the first selectors to prevent other calling lines from being connected to the same trunk. On incoming calls from the master office to the dial office, the trunk circuit involved in the connection provides a busy-marking potential, under control of a relay 87 (shown in Fig. 2), to prevent seizure by any of the local selectors on an outgoing call.

Assume now that a certain one of the trunk circuits TC1, TC2, TCX is to be marked busy in the dial office, due to trouble conditions which prevent completion of calls through the associated trunk or for any other reason, thereby to prevent seizure of this trunk circuit on calls from the dial office subscribers to the master office. An operator or attendant in the master office connects the plug P1 of a cord to the jack of an idle trunk, other than the trunk which is to be removed from service, thereby to establish connection with the associated two-way trunk circuit and incoming selector in the dial office. The relay 87 in this trunk circuit thereupon connects a busy-marking ground potential to the test terminals in the banks of selectors S1 to which the trunk circuit is connected to prevent seizure of this trunk circuit by any of these selectors, this busy-marking connection including a back contact of relay MB in the associated trunk make-busy circuit. Upon the dialing of the first digit of the code assigned to the trunk which the operator wishes to have marked as busy, the wipers of the incoming selector, associated with the trunk to which the operator's position equipment is connected, are stepped up to the corresponding level of the bank in which there are terminals connected to the make-busy connector MBC. The usual trunk-hunting operation of the selector thereupon automatically steps the wipers into engagement with terminals connected to an idle make-busy connector MBC. Only one such connector may be provided; in which case it would be connected to the first set of terminals in the selected level.

Upon seizure of make-busy connector MBC, relay A is operated in a loop circuit extending through conductors 21 and 22, the wipers of the incoming selector and the winding of a supervisory relay 88 in the trunk circuit involved in the connection from the operator. The operation of relay A closes a circuit for operating relay B; and relay B connects ground potential to test conductor 23 to hold the incoming selector in usual and well-known manner. When the next digit of the trunk number is dialed by the operator in the master office, the bridge across conductors 21 and 22 is alternately opened and closed in the trunk circuit to repeat the dial pulses to relay A; whereby relay A releases and reoperates, responsive to each dial pulse. Being slow to release relay B remains operated during the response of relay A to each train of dial pulses. The release of relay A, in response to the first pulse of a digit, closes a circuit for operating relay C and a circuit for operating vertical stepping magnet 34. When relay A reoperates at the end of the pulse, the stepping magnet 34 releases, but relay C is slow in releasing so as to remain operated while all of the pulses in a digit train are being received. Each succeeding release and reoperation of relay A causes a corresponding operation and release of stepping magnet 34. The vertical stepping magnet 34 is thereby operated to step the wipers vertically, one step for each dial pulse in the train. The vertical off-normal springs 36 are actuated by movement of the wipers out of normal position responsive to the first pulse, the circuit for energizing relay C being thereby transferred to include a front contact of relay C and back contact of relay K.

When the last digit of the trunk number is dialed, the release of relay A responsive to the first pulse causes the operation of rotary stepping magnet 35 and relay E in series in a circuit which includes back contacts of relays C and K and the continuity front contact of springs 36. Relay E closes a locking path independent of the back contact of relay K; and, being slow in releasing, relay E remains operated during response of relay A to all the succeeding pulses in the same digital train. The operation of relay E also closes a circuit for operating relay K; and relay K locks under the sole control of relay B. When relay A reoperates at the end of each pulse, the rotary stepping magnet 35 releases, each operation of magnet 35 being effective to advance the wipers one step. The wipers are thus advanced to the set of terminals to which the trunk make-busy circuit of any particular trunk is connected, which may be assumed to be the trunk make-busy circuit MBX associated with trunk TX as shown in Fig. 2.

The release of relay E after the wipers of the make-busy connector MBC have been advanced into engagement with the make-busy circuit of the desired trunk, closes a tone transmitting path from one of the code 1, code 2 and code 5 supply conductors through condenser 25 to the tip conductor whereby a tone is transmitted to the operator in the master office. If the associated trunk is idle and is not marked busy, relay MB in the selected make-busy circuit is not operated; in which case, relays BT and BT1 are not operated and the code 1 supply conductor is connected through back contacts of these relays, a front contact of relay K and back contact of relay E to condenser 25. If the associated trunk is in use and marked busy through a front contact of the one or the other of relays 84 and 87 of the associated trunk circuit, relay BT is operated through wiper 33 to the busy-marking ground potential; and in this case the code 2 supply conductor is connected to condenser 25. If the trunk with which the selected make-busy circuit is associated is busy, due to having previously been made busy by the operation of relay MB, both of relays BT and BT1 are operated, so that the code 5 supply conductor is connected to condenser 25. Thus the operator in the master office receives ringing code tone which identifies the condition of the trunk associated with the make-busy circuit to which the operator is connected.

If the tone received by the master office operator indicates that a trunk is idle and the operator desires to have this trunk marked busy and thus prevent selection of this trunk on calls from the dial office to the master office, the digit "0" is dialed, thereby transmitting a train of ten pulses to relay A of make-busy connector MBC. The release of relay A responsive to each pulse closes a circuit including the back contact of relay A, a front contact of relay B, continuity front contact of springs 36, a back contact of relay E, a first and a second front contact of relay K and the winding of code selector stepping magnet 42. The winding of relay C is operatively energized in parallel with magnet 42. The reoperation of relay A, at the end of each pulse, releases stepping magnet 42; but relay C, being slow to release, remains operated until all of the pulses in the train have been received. The wiper 41 of the code selector is thereby advanced step-by-step to terminal 10, the off-normal springs 43 being actuated responsive to movement of the wiper 41 out of normal position. With the wiper 41 engaging terminal 8, 9 or 10, a circuit is closed for energizing relay M, this circuit including the lower front contact of the off-normal springs 43. The operation of relay M closes a circuit for operating relay MB of the make-busy circuit with which the wipers 31, 32 and 33 are connected, this circuit including a resistor 50, the winding of relay MB, wiper 32 of the make-busy connector, front contact of relay M, lower front contact of springs 43 and a front contact of relay B. When operated, relay MB closes a locking path independent of the make-busy connector; and connects ground through the continuity front contact to the test terminals in the banks of selectors S1 to which the associated trunk circuit is connected, thereby preventing seizure of this trunk circuit by any of these selectors until restored to use by release of the trunk make-busy relay MB, as hereinafter described. The operation of relay MB also causes the operation of relay BT1, whereby the ringing code tone received by the operator is changed to code 5. The operator in the master office thereupon withdraws the plug of the cord from the trunk jack causing the release of relay A of the make-busy connector MBC, followed after a short interval by the release of relays B and K. The release of relays A and B closes a circuit for operating release magnet 37 to restore the wipers 31, 32 and 33 to normal; and closes a circuit operating the code-selector release magnet 44 to restore wiper 41 to normal and release relay M. The vertical off-normal springs 36 of the make-busy connector and off-normal springs 43 of the code selector restore to normal when the associated wipers reach normal position; whereupon the release magnets 37 and 44 are also released. The aforementioned release of relay B disconnects ground from test conductor 23, thereby causing return of the incoming selector to normal in usual and well-known manner.

To remove a busy marking from a trunk previously marked busy by operation of the MB relay of the associated make-busy circuit, the operator first establishes connection with this make-busy circuit in the manner above described. Upon hearing the code 5 ringing tone, the operator dials the digit 4, the wiper of code selector 40 being thereby stepped to position 4. As soon as the wiper 41 moves out of normal position, actuation of off-normal springs 43 connects ground through the back contact of relay M and brush 31 to short-circuit the winding of the make-busy relay MB and thus cause its release. Tht release of relay MB causes the release of relays BT and BT1, so that code 1 ringing tone is transmitted through condenser 25 to the master office operator. Release of the connection and return of the make-busy connector to normal is effected, as hereinbefore described.

If desired, the operator may dial the digit "0" after obtaining connection with the make-busy circuit associated with any particular trunk whereby the make-busy relay MB is released in the manner above described as soon as the off-normal springs 43 of the code selector are operated; and the make-busy relay MB is reoperated as soon as wiper 41 engages terminals 8, 9 and 10. This procedure removes the busy marking while the make-busy relay is released to allow release of any selectors S1 which might be held under control of the make-busy relay. The change in ringing tone indicates each condition. Release of the make-busy connector is effected in the manner above described.

The invention is not limited in its application to the particular arrangement shown. For instance, the control connection from the master office for marking a trunk busy may include a trunk other than one of the trunks which the operator is able to make busy. The invention may also be applied in an arrangement in which the dial office test distributor is employed to establish connection with the make-busy connector.

What is claimed is:

1. In a telephone system comprising an unattended dial office and a master office, trunks between said offices, individual trunk make-busy circuit means in said dial office for each of said trunks, switching means in said dial office for selecting the make-busy circuit means of a desired one of said trunks, control means comprising operator position dialing means in the master office controlling the operation of said switching means, and further switching means controlled by said control means for actuating any selected trunk make-busy circuit means.

2. In a telephone system comprising a dial office, a master office, trunks between said offices, switching means including selector switches in said dial office controlled by subscribers for selectively establishing connections between calling and called subscriber lines and between subscriber lines and said trunks, two-way trunk circuits in said dial office, each trunk circuit connected to a different one of said trunks and to a set of terminals in the bank of each of some of said selector switches, means in each of said trunk circuits effective while the associated trunk is in use to connect a busy-marking potential to one of the terminals in the bank of each selector to which the trunk circuit is connected, trunk make-busy circuits in said dial office, one for each of said trunk circuits, an operator position including dialing means in said master office, further switching means including a make-busy connector switch in said dial office operatively controlled by said operator position dialing means to select the bake-busy circuit associated with any desired one of said trunk circuits, and means associated with said make-busy connector switch and controlled by said operator position dialing means following selection of said make-busy circuit for operating said make-busy circuit to connect busy-marking potential to said one terminal in the bank of each selector to which the associated trunk circuit is connected.

3. In a telephone system according to claim 2, further means associated with said make-busy connector switch controlled by said operator position dialing means for operating any selected make-busy circuit to disconnect busy-marking potential from said one terminal in the bank of each selector to which the associated trunk is connected.

4. In a telephone system according to claim 2, further means associated with said make-busy connector switch controlled by said operator position dialing means for operating any selected make-busy circuit to disconnect busy-marking potential from said one terminal in the bank of each selector to which the associated trunk is connected, and for reconnecting the busy-marking potential to said one terminal after a short interval while connection is maintained from the operator position to the make-busy circuit.

5. In a telephone system comprising a dial office, a master office, trunks between said offices, switching means including selector switches in said dial office for selectively establishing connections between calling and called subscriber lines and between subscriber lines and said trunks, two-way trunk circuits in said dial office, each trunk circuit connected to a different one of said trunks and to a set of terminals in the bank of each of some of said selector switches, means in each of said trunk circuits effective while the associated trunk is in use to connect a busy-marking potential to one of the terminals in the bank of each selector to which the trunk circuit is connected, trunk make-busy circuits in said dial office, one for each of said trunk circuits, an operator position including dialing means in said master office, further switching means including a make-busy connector switch in said dial office operatively controlled by said operator position dialing means to select the make-busy circuit associated with any desired one of said trunk circuits, and means associated with said make-busy connector switch and controlled by the selected make-busy circuit for selectively transmitting a tone to said operator position indicative of the idle or busy condition of the associated trunk.

6. In a telephone system comprising a dial office, a master office, trunks between said offices, switching means including selector switches in said dial office for selectively establishing connections between calling and called subscriber lines and between subscriber lines and said trunks, two-way trunk circuits in said dial office, each trunk circuit connected to a different one of said trunks and to a set of terminals in the bank of each of some of said selector switches, means in each of said trunk circuits effective while the associated trunk is in use to connect a busy-marking potential to one of the terminals in the bank of each selector to which the trunk circuit is connected, an operator position including dialing means in said master office, trunk make-busy circuits in said dial office controlled by said operator position dialing means, further switching means including a make-busy connector switch in said dial office operatively controlled by said operator position dialing means to select the make-busy circuit associated with any desired one of said trunk circuits, and means associated with said make-busy connector switch and controlled by the selected make-busy circuit for selectively transmitting a first distinctive tone to said operator position in case the associated trunk is idle, a second distinctive tone to said operator position if said trunk is marked busy as being in use, and a third distinctive tone to said operator position if said trunk is marked busy by the associated make-busy circuit.

7. In a telephone system comprising an unattended dial office and a master office, trunks between said offices, each of said trunks including busy means operable when the trunk is in use to indicate the busy condition of said trunk, trunk make-busy means in said dial office individual to each of said trunks and operable to remove the associated trunk from use and to indicate an artificial busy condition for said trunk, an operator position dialing means in the master office, determining means in said dial office connectable to said trunks for determining the idle or indicated busy condition thereof, switching means in said dial office controlled by said operator position dialing means for connecting said determining means to any desired one of said trunks, and means controlled by said determining means for transmitting signals characterizing the idle or indicated busy condition of said desired one of said trunks to said master office.

8. In a telephone system comprising an unattended dial office and a master office, trunks between said offices, each of said trunks including busy means operable when the trunk is in use to indicate the busy condition of said trunk, trunk make-busy means in said dial office individual to each of said trunks and operable to remove the associated trunks from use and to indicate an artificial busy condition for said trunk, control means including operator position dialing means in said master office, first switching means in said dial office controlled by said control means for selecting the trunk make-busy means associated with any desired one of said trunks, second switching means in said dial office controlled by said control means for actuating any selected trunk make-busy means, determining means in said dial office connectable by said first switching means to said desired trunk for determining the idle or indicated busy condition thereof, and means controlled by said determining means for transmitting signals characterizing the idle or indicated busy condition of said desired trunk to said master office.

References Cited in the file of this patent

UNITED STATES PATENTS 2,142,653 Peterson ---------------- Jan. 3, 1939